United States Patent [19]

Johnston

[11] Patent Number: 4,654,240

[45] Date of Patent: Mar. 31, 1987

[54] LAMINATE FILM FOR FLEXIBLE CONTAINERS

[75] Inventor: William D. Johnston, Buffalo Grove, Ill.

[73] Assignee: Baxter Travenol Laboratories, Inc., Deerfield, Ill.

[21] Appl. No.: 655,492

[22] Filed: Sep. 28, 1984

[51] Int. Cl.⁴ .................. B65D 11/00; B32B 7/02; B32B 27/08

[52] U.S. Cl. .................... 428/35; 428/215; 428/216; 428/220; 428/475.2; 428/476.9; 428/483; 428/518; 428/522

[58] Field of Search .............. 428/476.1, 475.2, 476.9, 428/476.3, 480, 483, 35, 516, 215, 216, 220, 336, 213, 518, 412, 522; 156/244.11, 331.7, 324; 128/272; 604/414

[56] References Cited

U.S. PATENT DOCUMENTS

| 3,023,126 | 2/1962 | Underwood et al. | 428/336 |
| 3,489,631 | 1/1970 | Chen et al. | 156/244.11 |
| 3,715,074 | 2/1973 | Michel | 128/272 X |
| 3,836,425 | 9/1974 | Whiting | 428/213 |
| 3,997,383 | 12/1976 | Bieler et al. | 156/244.11 |
| 4,008,352 | 2/1977 | Dawes et al. | 428/476.9 |
| 4,092,202 | 5/1978 | Bergk et al. | 156/331.7 |
| 4,095,012 | 6/1978 | Schirmer | 428/516 X |
| 4,104,404 | 8/1978 | Bieler et al. | 428/35 |
| 4,140,162 | 2/1979 | Gajewski et al. | 428/35 |
| 4,180,614 | 12/1979 | Angelo et al. | 428/336 |
| 4,184,005 | 1/1980 | Bauriedel et al. | 156/324 |
| 4,210,686 | 7/1980 | Gajewski et al. | 428/35 |
| 4,268,531 | 5/1981 | Whiting, Jr. | 428/476.9 |
| 4,302,511 | 11/1981 | Tuller et al. | 428/476.9 |
| 4,322,003 | 3/1982 | Long | 428/480 X |
| 4,322,480 | 3/1982 | Tuller et al. | 428/476.9 |
| 4,326,574 | 4/1982 | Pallaroni et al. | 604/414 |
| 4,352,850 | 10/1982 | Yamamoto et al. | 428/516 X |
| 4,370,374 | 1/1983 | Raabe et al. | 428/476.1 |
| 4,397,916 | 8/1983 | Nagano | 428/476.9 |
| 4,398,642 | 8/1983 | Okudaira et al. | 428/475.2 |
| 4,399,173 | 8/1983 | Anthony et al. | 428/35 |
| 4,405,667 | 9/1983 | Christensen et al. | 428/476.1 |
| 4,407,873 | 10/1983 | Christensen et al. | 428/476.1 |
| 4,410,595 | 10/1983 | Matsumoto et al. | 428/412 |
| 4,440,815 | 4/1984 | Zomorodi et al. | 428/35 |
| 4,482,585 | 11/1984 | Ohodaira et al. | 428/35 |
| 4,501,781 | 2/1985 | Kushida et al. | 428/475.2 |

FOREIGN PATENT DOCUMENTS 0067420 12/1982 European Pat. Off. .............. 428/35

Primary Examiner—Thomas J. Herbert
Attorney, Agent, or Firm—Robert M. Barrett; John P. Kirby, Jr.; Paul C. Flattery

[57] ABSTRACT

A laminate film for producing a flexible container comprising an outermost layer made of polyethylene terephthalate or biaxially oriented polypropylene, an intermediate layer made of a polyamide optionally layered with a highly transparent resin, and an innermost layer made of a transparent heat-sealable resin.

14 Claims, 2 Drawing Figures

LAMINATE FILM FOR FLEXIBLE CONTAINERS

BACKGROUND OF THE INVENTION

This invention relates to a film structure for flexible containers. In particular, this invention relates to a multilayer laminate film structure for flexible containers capable of containing a liquid to be maintained under sterile conditions.

Flexible containers are utilized in the medical industry for containing, inter alia, parenteral solutions including intravenous solutions, dialysis solutions, nutrition products, respiratory therapy products, and plasma. Because these containers are utilized to contain fluids or solids that are introduced into a patient's body, it is necessary for the containers to be: essentially transparent; flexible; essentially free of extractables; and capable of maintaining the product contained therein under sterile conditions until the product is accessed or removed from the flexible container.

It is necessary that these containers are highly transparent, with little or no haze, so that the solution contained therein can be observed clearly and easily; this allows one to determine if the solution contained therein is contaminated, denatured, or defective in some other way. In addition, it is also sometimes necessary for the container to have a low water vapor and oxygen permeability so as not to degrade the solution contained therein.

It is also desirable for the container to be sufficiently strong and have a sufficiently high breaking strength so that the container will not be easily damaged if it is accidentally dropped. Moreover, the film from which the container is constructed should have satisfactory heat sealing properties so that the inside layer of the film may be heat sealed together to create the container in some type of production machine. Furthermore, the container should have sufficient heat resistant properties to withstand steam or other high temperature (100°–140° C.) sterilization. This requires that the container does not lose its transparency during sterilization.

Typical containers for medical solutions and the like include glass bottles, blow-molded polypropylene containers, and polyvinyl chloride bags. Each of these containers exhibit some potential disadvantage.

Glass bottles are easily broken. Moreover, the alkali ingredients in the glass may be leached out into the solution. Furthermore, glass bottles, because they do not collapse, must be vented. It is possible for infection to be transmitted to the patient due to the venting. Of course, glass does not provide a container that is flexible.

Blow-molded polypropylene containers lack needed transparency. Like glass bottles they also must be vented and accordingly there is the possibility of infection due to this venting.

In polyvinyl chloride bags it is possible that the plasticizers in the film may leach out into the solution.

Thus, there is a need for a film for creating a flexible container that overcomes the disadvantages of the prior art.

SUMMARY OF THE INVENTION

The present invention provides a film laminate for flexible containers capable of containing a product to be maintained and extracted under sterile conditions. The flexible container of this invention may be terminally sterilized by steam sterilization. The film comprises an outermost layer made of a polyester or a polypropylene, a core layer made of polyamide or a polyamide layered with a highly transparent heat resistant resin or an ethylene vinyl alcohol copolymer both surfaces of which are layered with a highly transparent heat resistant resin and an innermost layer made of a transparent heat sealable resin. The film may be heat sealed to create a container for preserving the intravenous solution. The core layer may be optionally laminated with a transparent resin layer to provide improved barrier properties.

The laminate film preferably has a total thickness of approximately 77 to about 200 microns. The outermost layer preferably has a thickness of approximately 12 to about 30 microns, the core layer preferably has a thickness of approximately 15 to about 50 microns and the innermost layer preferably has a thickness of approximately 50 to about 120 microns.

The container constructed from the film of the present invention is highly transparent allowing the solution contained therein to be clearly observed through the walls of the container. In addition, the film for the flexible container prevents the permeation of water vapor, oxygen, and other gases, as well as providing sufficient strength to the container. Furthermore, the film exhibits sufficiently heat sealing properties to produce a good heat seal for creating the container. The film may be used to produce a flexible container capable of housing a solution to be maintained and extracted under sterile conditions.

The container of this invention may be terminally sterilized by steam sterilization. If the container is to be subjected to high temperature sterilization (115° C. to 140° C.), preferably the innermost layer of the container is made of a high density polyethylene, a modified high density polyethylene with polyisobutylene or a polypropylene. If the container is to be subjected to high temperature sterilization of 100° C. to 115° C., the innermost layer is preferably made of a low density polyethylene, a linear low density polyethylene, a medium density polyethylene, a linear medium density polyethylene, an ethylene vinyl acetate copolymer, a high density polyethylene or a polypropylene. A container for intravenous solution comprising an outermost layer made of polyethylene terephthalate or biaxially oriented polypropylene, a core layer made of polyamide optionally layered with a highly transparent heat resistant resin or an ethylene vinyl alcohol copolymer both surfaces of which are layered with a highly transparent heat resistant resin, and an innermost layer made of polypropylene exhibits excellent heat resistant properties that can withstand steam sterilization usually at temperatures of 100°–140° C., with no substantial reduction in the transparency, and can preserve the solution contained therein satisfactorily.

Additional features and advantages are described in, and will be apparent from the Presently Preferred Embodiments of the Invention and from the drawings.

PRESENTLY PREFERRED EMBODIMENT OF THE INVENTION

The film structure of the present invention is utilized to produce flexible containers capable of containing a fluid or solid to be maintained and extracted under sterile conditions. The containers of this invention are constructed so that they can be terminally sterilized. These containers typically consist of a liquid containment body defined by thermally sealed walls. The containers are utilized to package, inter alia, parenteral products, frozen drugs, nutrition products, respiratory therapy products, and plasma. The preferred film structure of this invention is a multilayer laminate structure designed to package parenteral products including intravenous solutions, nutrition products, respiratory therapy products, and plasma.

Figure 1:
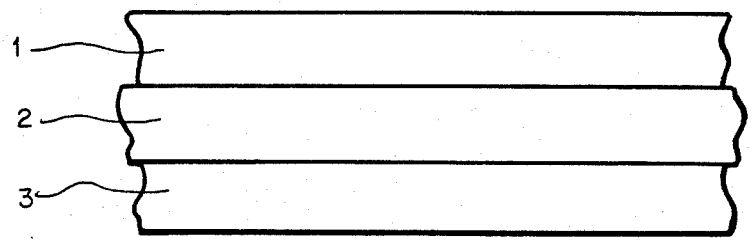
FIG. 1 illustrates a cross-sectional view of the film of this invention.

Referring to FIG. 1, a presently preferred embodiment of the film laminate structure 10 of the present invention is illustrated. The film 10 comprises an outermost layer 1 made of polyethylene terephthalate or biaxially oriented polypropylene, a core layer 2 made of a polyamide optionally laminated or covered with a transparent heat resistant resin layer or an ethylene vinyl alcohol copolymer both surfaces of which are laminated or covered with a transparent heat resistant resin layer, and an innermost layer 3 made of a transparent heat-sealable resin. The core layer 2 can be optionally laminated or coated with a highly transparent resin to provide improved gas barrier properties.

The polyethylene terephthalate constituting the outermost layer 1 may be either oriented or not. It is presently preferred to utilize biaxially-oriented polyethylene terephthalate for the outermost layer 1.

The polyamide usable herein for constituting the core layer 2 may be either oriented or cast. Examples of polyamides that function satisfactory are nylon 6, nylon 6-6, nylon 11 and nylon 12; nylon 6 and nylon 6-6 are presently preferred.

In a further embodiment of the invention, the polyamide resin may be laminated with a highly transparent resin to provide improved barrier properties. For example, a coating of a polyvinylidene chloride resin may be laminated over the polyamide resin in order to improve the gas and water vapor barrier performance.

The heat-sealable resin constituting the innermost layer 3 is preferably chosen from the group comprising low density polyethylene, linear low density polyethylene, a linear medium density polyethylene, medium density polyethylene, modified high density polyethylene with polyisobutylene, ethylene vinyl acetate copolymer, polypropylene, or the like. If ethylene vinyl acetate is chosen it is preferred that it contains 2–30 weight percent vinyl acetate as copolymer.

If a medical product is filled in the container 20 made of the film laminate according to the present invention and the container in which the medical product is filled is subjected to high temperature sterilization of 115° C. to 140° C., the innermost layer 3 may be preferably selected from high density polyethylenes, modified high density polyethylenes with polyisobutylenes and cast polypropylenes. If the container 20 in which the medical product is filled is subjected to high temperature sterilization of 100° C. to 115° C., the innermost layer 3 may preferably be selected from the group comprising low density polyethylene, linear low density polyethylene, medium density polyethylenes, high density polyethylene and cast polypropylene. If a previously sterilized medical product is filled in the container, the innermost layer may 3 preferably be selected from the group comprising ethylene vinyl acetate copolymer, low density polyethylene and linear low density polyethylene.

Figure 2:
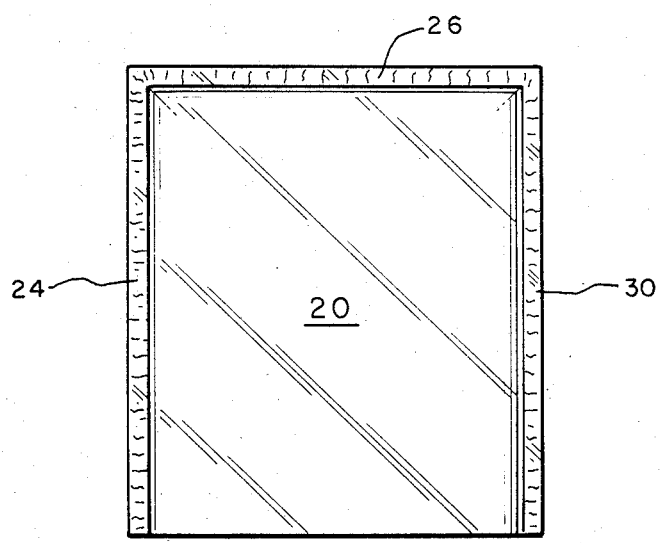
FIG. 2 illustrates a plan view of a flexible container constructed from the film of this invention.

Referring to FIG. 2, a flexible container 20 produced from the film 10 of this invention is illustrated. As illustrated, the innermost layers 3 are heat sealed together at walls 24, 26 and 30. Due to the construction of the innermost layer 3 a strong heat seal is created. Thus, the present invention creates a film laminate structure 10 that can be constructed into a container 20 that can house a medical product to be maintained and extracted under sterile conditions.

The laminate 10 for creating the flexible container 20 preferably has a thickness of approximately 75 microns to about 200 microns. The outermost layer 1 preferably has a thickness of 12 to 30 microns, the core layer 2 has a thickness of approximately 15 to about 50 microns, the innermost layer 3 preferably has a thickness of approximately 50 to about 120 microns.

A container 20 constructed from a laminate 10 with the above-identified dimensions provides an improved container. If the total thickness of the film laminate 10 is less than 75 microns, the impact strength of the container 20 made from the film will not be sufficient; although the transparency of the flexible container 20 made therefrom will be excellent. If the total thickness of the film laminate 10 is in excess of 200 microns, the container 20 constructed therefrom will lack flexibility. This lack of flexibility will cause the container 20 to not drain sufficiently. Moreover, a thickness of over 200 microns results in reduced transparency as well as poor heat-sealing properties.

The preferred thickness of each layer of the laminate film 10 is approximately 12 to about 25 microns for the outermost layer 1, approximately 15 to about 30 microns for the core layer 2 and approximately 60 to about 120 microns for the innermost layer. Preferably, the total thickness of the laminate 10 is between approximately 110 to about 175 microns.

The container 20 of the present invention can be used to house a product that may or may not be terminally sterilized, or may be sterilized at high temperatures. For example, if the container 20 has an innermost layer 3 constructed from a high density polyethylene, a modified high density polyethylene with polyisobutylene or a cast polypropylene as the heat sealable resin, the resultant container 20 may be sterilized at high temperatures (115°–140° C.). The container 20 may also have an innermost layer 3 constructed from low density polyethylene, linear low density polyethylene, medium density polyethylene, linear medium density polyethylene, ethylene vinyl acetate copolymer, a modified high density polyethylene with polyisobutylene, high density polyethylene or polypropylene and still be sterilized at high temperatures (100°–115° C.). Among them, a low density polyethylene and a linear low density polyethylene are most preferred because of their high strength. If the heat sealable resin constituting the innermost layer 3 is made of a resin that will not withstand high temperatures, i.e. will soften, for example, low density polyethylene, linear low density polyethylene and ethylene vinyl acetate copolymer, the container may be steam sterilized at lower temperatures so as to cause no softening or denaturing of the resin. As used herein, steam sterilized refers to sterilization at temperatures of 100°–140° C., and high temperature sterilization refers to sterilization, including steam, at temperatures of 115°–140° C.

The laminate film 10 of this invention is produced by lamination. The preferred lamination process is a "dry lamination" process. Preferably the outer, core and innermost layers 1, 2 and 3 are bonded together by an adhesive. Preferably, a polyurethane adhesive is used. The preferred adhesive is two-part aliphatic polyester polyurethane.

The container 20 of this invention can effectively preserve solutions for medical treatment such as intravenous solutions, e.g. glucose solutions, Ringer's solutions and amino acid formulations. This invention will now be described more specifically by way of example, and not limitation.

EXAMPLE 1

Flexible containers structure shown in Table 1 were prepared and the transparency, haze, moisture permeation, and breaking strength thereof were examined. The results are shown in Table 2.

Method of evaluating oxygen gas permeation: According to JIS-Z-1707.

Method of evaluating the breaking strength and evaluation standards:

A predetermined amount of water was charged in each of containers and after, heat sealing, each container was dropped from a 1.8 meter height to the ground so that the flat surface thereof was in contact with the ground surface. Those containers with no liquid leak were evaluated as "o" and those showing break or liquid leakage were evaluated as "x."

The above results confirm that the flexible containers 20 of this invention have a high transparency and a low haze, thereby enabling one to clearly observe the solution contained therein through the walls of the container. Moreover, the containers have a low permeability to water vapor, oxygen and other gases, as well as a high breaking strength. Accordingly, a solution can be stored statisfactorily in a sterile condition in the container 20.

TABLE 1

STRUCTURE OF FLEXIBLE CONTAINERS

| Sample No. | Container inner volume (cc) | Total thickness ($\mu$m) | Outermost layer | ($\mu$m) | Core layer | ($\mu$m) | Innermost layer | ($\mu$m) |
|---|---|---|---|---|---|---|---|---|
| 1 | 500 | about 115 | PET | 12 | PVDC Coated nylon 6 | 25 | Low density polyethylene | 75 |
| 2 | | 140 | PET | 16 | nylon 6-6 | 25 | Ethylene vinyl acetate copolymer | 95 |
| 3 | | 120 | Biaxially oriented polypropylene | 20 | PVDC coated nylon 6 | 25 | Low density polyethylene | 75 |
| 4 | | 120 | Biaxially oriented polypropylene | 20 | nylon 6-6 | 25 | Ethylene vinyl acetate copolymer | 75 |
| 5 | 1000 | 155 | PET | 25 | PVDC coated nylon 6 | 30 | Low density polyethylene | 100 |
| 6 | | 155 | " | 25 | nylon 6 | 30 | Ethylene vinyl acetate copolymer | 100 |
| 7 | | 160 | Biaxially oriented polypropylene | 30 | PVDC coated nylon 6 | 30 | Low density polyethylene | 100 |
| 8 | | 160 | Biaxially oriented polypropylene | 30 | nylon 6-6 | 30 | Ethylene vinyl acetate copolymer | 100 |

PVDC: Polyvinylidene chloride

TABLE 2

| Sample No. | Transparency | Haze | Water vapor permeation (g/m$^2$ · 24 hrs) | Oxygen gas permeation (cc/m$^2$ · 24 hrs · atm) | Breaking Strength |
|---|---|---|---|---|---|
| 1 | 88.7 | 12.2 | 1.8 | 15 | o |
| 2 | 90.3 | 12.1 | 3.0 | 40 | o |
| 3 | 89.1 | 12.8 | 2.0 | 18 | o |
| 4 | 91.0 | 11.5 | 3.7 | 52 | o |
| 5 | 87.8 | 14.1 | 1.0 | 13 | o |
| 6 | 88.6 | 13.8 | 2.0 | 35 | o |
| 7 | 87.3 | 14.2 | 1.0 | 12 | o |
| 8 | 89.1 | 13.3 | 1.8 | 33 | o |

Method of evaluating transparency and haze: According to ASTM D 1003 (integration sphere type photoelectronic photometer).

Method of evaluating moisture permeation: According to JIS-Z-0208.

EXAMPLE 2

Flexible containers 20 having the structure shown in Table 3 were prepared and the transparency, haze, moisture permeability and breaking strength thereof were examined by the same procedures as in Example 1. The results are shown in Table 4.

TABLE 3

STRUCTURE OF FLEXIBLE CONTAINERS

| Sample No. | Inner volume (cc) | Total thickness (μm) | Outermost layer Material | Thickness μm | Core layer Material | Thickness μm | Innermost layer Material | Thickness μm |
| --- | --- | --- | --- | --- | --- | --- | --- | --- |
| 9 | 500 | 110 | PET | 12 | nylon 6 | 20 | Cast PP | 80 |
| 10 |  | 130 | PET | 16 | nylon 6-6 | 25 | " | 90 |
| 11 |  | 120 | Biaxially oriented polypropylene | 20 | nylon 6 | 20 | " | 80 |
| 12 |  | 140 | Biaxially oriented polypropylene | 25 | nylon 6-6 | 25 | " | 90 |
| 13 | 1000 | 135 | PET | 25 | nylon 6 | 30 | " | 80 |
| 14 |  | 150 | " | 30 | nylon 6-6 | 30 | " | 90 |
| 15 |  | 135 | Biaxially oriented polypropylene | 25 | nylon 6 | 30 | " | 80 |
| 16 |  | 150 | Biaxially oriented polypropylene | 30 | nylon 6-6 | 30 | " | 90 |

PET: Polyethylene terephthalate
PP: Polypropylene

TABLE 4

| Sample No. | Transparency (%) | Haze (%) | Water vapor permeation (g/m² · 24 hrs) | Breaking Strength |
| --- | --- | --- | --- | --- |
| 9 | 88.6 | 12.1 | 1.8 | O |
| 10 | 91.5 | 11.0 | 2.5 | O |
| 11 | 91.0 | 12.5 | 2.4 | O |
| 12 | 89.1 | 11.6 | 3.2 | O |
| 13 | 88.8 | 11.4 | 1.5 | O |
| 14 | 89.4 | 12.6 | 2.0 | O |
| 15 | 88.9 | 11.5 | 1.9 | O |
| 16 | 88.4 | 12.9 | 1.8 | O |

Flexible containers having the structure shown in Table 5 were prepared and changes in the transparency and the haze thereof, before and after the heat treatment, were examined. The results are shown in Table 6.

TABLE 5

STRUCTURE OF FLEXIBLE CONTAINERS

| Sample No. | Outermost layer Material | Thickness (μm) | Core Layer Material | Thickness (μm) | Innermost Layer Material | (μm) Thickness |
| --- | --- | --- | --- | --- | --- | --- |
| 17 | PET | 12 | nylon 6 | 30 | Cast PP | 80 |
| 18 | PET | 12 | nylon 6 | 15 | Cast PP | 70 |
| 19 | Biaxially Oriented PP | 20 | nylon 6 | 30 | Cast PP | 60 |
| 20 | Biaxially Oriented PP | 25 | nylon 6 | 30 | Cast PP | 80 |
| 21 | Biaxially Oriented PP | 25 | nylon 6 | 30 | Cast PP | 100 |
| 22 | Biaxially Oriented PP | 25 | nylon 6 | 30 | Cast PP | 160 |

TABLE 6

| No. | Before Heat Treatment Transparency % | Haze % | After Heat Treatment Transparency % | Haze % |
| --- | --- | --- | --- | --- |
| 17 | 89.3 | 21.6 | 86.5 | 20.6 |
| 18 | 89.5 | 6.3 | 89.5 | 12.0 |
| 19 | 90.5 | 8.5 | 87.7 | 15.4 |
| 20 | 91.6 | 9.5 | 90.4 | 14.5 |
| 21 | 90.8 | 9.0 | 87.2 | 15.3 |
| 22 | 90.0 | 12.9 | 89.4 | 25.3 |

Heat treatment condition: 120° C., 30 min.

The above results demonstrate that the containers constructed from a film with an innermost layer of non-oriented polypropylene of this invention have a high transparency and a low haze, enabling one to observe the solution contained therein clearly through the wall of the container. The containers further have an excellent heat resistant property, i.e. exhibit little reduction in the transparency or increase in haze upon heat treatment. Moreover, the containers have a low permeability to water vapor, oxygen and other gases, and have a high breaking strength. Accordingly, a solution can be stored satisfactory in a sterile condition in the container 20 to be maintained and housed under sterile conditions.

I claim:

1. A flexible film laminate for a flexible medical product container to be sterilized at temperatures from approximately 110° C. to about 140° C. comprising:
   an outer layer selected from the group consisting of polyethylene terephthalate or polypropylene;
   a core layer constructed from a polyamide; and
   an inside layer selected from the group consisting of medium density polyethylene, linear medium density polyethylene, high density polyethylene, modified high density polyethylene with polyisobutylene.

2. The film laminate of claim 1 wherein the inside layer comprises cast polypropylene.

3. The film laminate of claim 1 including a layer of polyvinylidene chloride located on a side of the core layer.

4. A film laminate for a flexible medical product container to be sterilized at temperatures from approximately 110° C. to about 140° C. comprising:

an outer layer selected from the group consisting of polyethylene terephthalate or polypropylene;

a core layer constructed from a polyamide; and an inside layer selected from the group consisting of medium density polyethylene, linear medium density polyethylene, high density polyethylene, modified high density polyethylene with polyisobutylene;

the outer layer having a thickness of approximately 12 microns to about 30 microns;

the core layer having a thickness of approximately 15 microns to about 50 microns; and the inner layer having a thickness of approximately 50 microns to about 120 microns.

5. The film laminate of claim 4 wherein the film has a total thickness of approximately 77 microns to about 200 microns.

6. The film laminate of claim 5 wherein:

the outer layer has a thickness of approximately 12 to about 25 microns;

the core layer has a thickness of approximately 15 to 30 microns; and the inner layer has a thickness of approximately 60 to about 120 microns.

7. The film laminate of claim 6 wherein the total thickness of the film laminate is approximately 110 to 175 microns.

8. A flexible container for containing a product to be maintained and extracted under sterile conditions, the container capable of being steam sterilized at temperatures from approximately 110° to about 140° C. comprising:

an outer layer selected from the group consisting of polyethylene terephthalate or polypropylene;

a core layer constructed from a polyamide; and an inside layer selected from the group consisting of medium density polyethylene, linear medium density polyethylene, high density polyethylene, ethylene vinyl acetate copolymer and polypropylene.

9. The flexible container of claim 8 wherein the inside layer comprises cast polypropylene.

10. The flexible container of claim 8 including a layer of polyvinylidene chloride located on a side of the core layer.

11. The film laminate of claim 8 wherein:

the outer layer has a thickness of approximately 12 microns to about 30 microns;

the core layer has a thickness of approximately 15 microns to about 50 microns; and the inner layer has a thickness of approximately 50 microns to about 120 microns.

12. The flexible container of claim 11 wherein the container has a total thickness of approximately 77 microns to about 200 microns.

13. The flexible container of claim 12 wherein:

the outer layer has a thickness of approximately 12 to about 25 microns;

the core layer has a thickness of approximately 15 to 30 microns; and the inner layer has a thickness of approximately 60 to about 120 microns.

14. The flexible container of claim 13 wherein the total thickness of the flexible container is approximately 110 to 175 microns.

* * * * *

UNITED STATES PATENT AND TRADEMARK OFFICE
CERTIFICATE OF CORRECTION

PATENT NO. : 4,654,240
DATED : March 31, 1987
INVENTOR(S) : William D. Johnston et al It is certified that error appears in the above-identified patent and that said Letters Patent are hereby corrected as shown below:

Title page:

In the section showing the inventors (75) add:

Yasuhiko Hori of Kawasaki, Japan
   Masanori Nagata of Tokyo, Japan
   Shigeki Imano of Kawasaki, Japan

Signed and Sealed this

Fifteenth Day of December, 1987

Attest:

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO. : 4,654,240

DATED : March 31, 1987

INVENTOR(S) : William D. Johnston, et al

It is certified that error appears in the above-identified patent and that said Letters Patent is hereby corrected as shown below:

Front page, first column:

Assignees: Fujimori Kogyo Co., Inc., Tokyo, Japan, and Baxter Travenol Laboratories, Inc., Deerfield, Illinois Signed and Sealed this Eighteenth Day of October, 1988

Attest:

DONALD J. QUIGG

Attesting Officer

Commissioner of Patents and Trademarks